Patented Apr. 1, 1941

2,236,844

UNITED STATES PATENT OFFICE 2,236,844

FOOD PRODUCT AND PROCESS OF MAKING SAME

Emory L. Cocke, Atlanta, Ga., and Benjamin H. Ticknor, II, Englewood, N. J., assignors of one-half to Commercial Molasses Corporation, New York, N. Y., a corporation of Delaware, and one-half to Suni-Citrus Products Company, Haines City, Fla., a corporation of Florida No Drawing. Application March 17, 1939, Serial No. 262,568

11 Claims. (Cl. 99—6)

This invention relates to food products for animal consumption, and particularly to such products containing a high content of molasses or other saccharine material. More particularly still, it relates to such products employing materials such as citrus fruit residues.

The value of saccharine materials, such as molasses, as a foodstuff for animals has long been recognized with the result that such materials have been recommended for use as such in various forms. The use of molasses and similar materials, however, has been seriously hampered for a number of reasons. Blackstrap molasses commercially available for foodstuff purposes is a sticky fluid which varies rather widely in viscosity with changes in temperature, and accordingly is both expensive to transport and difficult to handle. Its relatively high water content adds materially to the cost of transportation, as well as affecting its fluidity. Variations in the water content and fluidity have made it difficult for the feeder using the material on a limited scale to accurately measure and handle the amounts of molasses required for any particular desired purpose. These same factors, as well as others, have made it difficult to incorporate molasses in mixed feeds regardless of whether they are prepared by hand or machine.

The most practical and economical method of transporting and handling saccharine materials such as blackstrap molasses is in the substantially anhydrous, granular form. It has, however, previously been difficult and expensive to substantially completely dehydrate molasses as well as to retain it in a satisfactory form after it has been dehydrated, due to its customary hygroscopic character which causes it to absorb moisture from the atmosphere and become sticky or even packed to such an extent that handling becomes increasingly difficult or impossible.

One of the most promising methods of using molasses and similar saccharine materials consists of incorporating it with a suitable absorbent type material which will permit the production of a relatively high molasses-content material in a pulverulent non-sticky form. In the past, various kinds of saccharine materials, and particularly different kinds of molasses, such as blackstrap molasses, have been absorbed on a wide variety of substances and the resulting products used as animal and poultry foodstuffs. These prior products, however, in general have not been satisfactory for a number of reasons. In many instances, for example, the absorbent used either possessed little or no nutritive value, or even was detrimental in character. Of equal, and in some instances greater, importance from a dietary and economic point of view, is the fact that the absorbents used in the past were capable of giving products of only relatively low molasses, or sugar, content. Attempts to increase the molasses content of foodstuffs made from nutrient type absorbents have usually given products which were subject to the same defects as the molasses when used alone, that is, they were sticky or hygroscopic in character and hence difficult to handle and transport, or otherwise not generally suitable for use as foodstuffs. While in a few instances foodstuffs of high molasses content of suitable physical characteristics have been reported, they have been prepared from materials not easily digestible, such as fiber, moss, peat, charcoal, bagasse, etc., which possess the obvious disadvantage of supplying a high percentage of inerts in the resulting foodstuffs.

We have now discovered that a high molasses content product of excellent characteristics as a foodstuff and which possesses the important added advantage of being sufficiently non-sticky and non-hygroscopic to permit shipping in bags and similar containers may be obtained by using chemically treated citrus fruit residue as absorbents for the molasses or other saccharine material. The incorporation of molasses or other similar saccharine material with citrus fruit residue has a further added advantage of making available as a foodstuff waste materials previously unsatisfactory for this purpose on account of their unpalatability and deficiency in certain nutrients and other materials essential for a good foodstuff.

Previous attempts to incorporate molasses with the unpalatable and nutrient deficient citrus fruit residue gave a product of somewhat improved palatability, but still unsatisfactory in several respects and particularly on account of its inability to absorb substantial quantities of molasses, and the hygroscopic character of products of even relatively low molasses content, thus making it unsuited for the most desirable methods of transportation, handling, and storing.

An object of our invention is to produce a citrus fruit residue foodstuff of high molasses content of improved physical characteristics including reduced hygroscopicity and stickiness. Our method of obtaining this improved feedstuff may be illustrated by the following specific example but it is understood, of course, that we are not limited to the exact manipulative steps or apparatus described therein, since obvious variations of both will naturally occur to one skilled in the art.

In carrying out our invention we first reduce to relatively small pieces, by any suitable means such as by slicing, cutting, sawing, shredding, pounding, etc., citrus fruit residue obtained from canning plants or other sources and comprising such material as orange, and grapefruit skins, peels, rags, seeds, etc. As the result of this comminuting operation a large proportion of the cell walls of the various citrus fruit products are broken down with the liberation of aqueous liquor contained therein. At the conclusion of the comminuting operation, this aqueous liquor may, if desired, be removed from the remaining solid material by decantation, filtration, centrifuging, or other suitable means. It is not essential to the success of our operation, however, that the aqueous liquor be removed at this point.

After the citrus fruit residue has been reduced to small pieces as above described, it is next mixed with minerals which after being absorbed by the residue, cause such changes in the cellular structure that the residue, after having water expelled mechanically, by pressure, etc., absorbs greater quantities of molasses than heretofore possible. Also, these dietary materials are necessary for a balanced foodstuff. These materials, in connection with the subsequent treatment to be described, assist in increasing the feeding value of the final product. On account, therefore, of the varied function of these chemicals, the proportion and the exact composition of the chemicals used for treating the comminuted citrus fruit residue may be varied to some extent, depending upon the locality in which the citrus fruit residue is produced, as well as the amount and character of saccharine material to be incorporated with the citrus fruit residue. In general, however, we have found that a satisfactory foodstuff is obtained by adding to the mass of citrus fruit residue four-tenths of one per cent by weight (dry basis) of the following mineral mixture to a given amount of residue:

| | Pounds |
|---|---|
| Oyster shell flour | 2000 |
| Dolomitic limestone | 1000 |
| Dicalcium phosphate | 1000 |
| Ferric oxide | 50 |
| Copper sulfate | 2 |
| Potassium iodide | 1 |

It will be understood, however, that our invention is not limited to the specific proportions or to the particular combination of materials given above. For example, the ferric oxide, copper sulfate and potassium iodide may one or all be omitted unless specifically required as dietary ingredients. Calcium carbonate, calcium hydroxide, calcium oxide, or other non-toxic calcium materials, may be substituted for the oyster shell flour. A mixture of calcium and magnesium carbonate may be substituted for the dolomitic limestone.

After mixing the chemicals with the comminuted citrus fruit residue, the whole is then placed in a suitable apparatus or vat, as for example, an enclosed steam box containing a cut-flight conveyor, where it is subjected to agitation and to heat treatment such as a cooking or steaming operation. This procedure has the effect of further changing the cellular structure of the citrus fruit thereby facilitating the entry of the chemical mixture. This heat treatment in the presence of chemicals also increases the dietary value of the citrus fruit residue and also makes easier the expression of the excess moisture therein, as well as facilitating the subsequent absorption of increased proportions of molasses or other saccharine material which it may be desired to incorporate in the citrus fruit residue. This constitutes an important feature of our invention since previously the expression of the excess moisture, and the incorporation of molasses in amounts in excess of 40-50% in a manner so as to give a satisfactory commercial product, have not been possible. Previous attempts to increase the molasses content above this point have given products which could not be readily dried or stored and transported. During certain seasons of the year, depending on the extent of ripeness of the fruit it may not be necessary to steam or cook the residue. However, it is usually preferable.

After heating the mixture of chemicals and citrus fruit residue for a suitable period of time, e. g. at about 150° F., the excess water liberated during the operation is removed by any convenient means, such as for example by filtration. According to a preferred procedure, we convey the citrus fruit residue at the conclusion of the heat treatment to continuous hydraulic presses where it enters at a temperature of about 150° F., and has its moisture content reduced from 85%-87% to about 70%. It is not essential that the residue be conveyed directly from the cooker to the presses while still hot, since it may, if desired, be permitted to cool and then be pressed, filtered or centrifuged.

After removal of the excess aqueous liquor, the moist citrus fruit residue is next mixed in any convenient manner with the desired amount of saccharine material which may, for example, be blackstrap or high test cane molasses, hydrol, etc. The amount to be added will of course be governed by the type and sugar content of the saccharine material employed and the character of finished product desired. In most cases, however, it will be desired to incorporate the maximum quantities of molasses or other saccharine material which will give a non-sticky, non-hygroscopic product. It is preferred to add an amount of blackstrap cane molasses, or equivalent material, required to give a final product of from 20% to 70%, and preferably, from 50% to 70% molasses content on a dry basis. The exact amount of molasses mixed with the moist citrus fruit residue will, of course, depend upon the sugar concentration of the particular sample of molasses used.

The mixture of moist citrus fruit residue and molasses, or other saccharine material, is finally dried by any means suitable for dehydrating the mixture without unduly affecting the citrus fruit residue and the sugars of the molasses. This may be satisfactorily accomplished by passing the mixture through a rotary drier where the drying is effected by the aid of hot flue gases. A temperature of 170-220° F. at the outlet of such a drier has been found to give a satisfactory final product. It should be understood, however, that the time and temperature of drying, as well as of the cooking and mixing operations, are dependent upon the sizes and types of equipment used. The rate and temperature of the drying, for example, should not be such as to cause caramelization or carbonization of the sugars or citrus pulp.

The product leaving the rotary drum drier may suitably have a moisture content of 6%–9%. As has been previously indicated, the molasses content will vary depending upon the character of the molasses and the type of finished food product desired. In general, however, the molasses content will vary from 20% to 70%, and preferably from 50% to 70% on a dry basis, but we do not wish to be limited to these specific proportions, since satisfactory products of both higher and lower molasses content have been obtained by our process. The finished product is flaky, granular or mealy in character, quite palatable, non-sticky and substantially non-hygroscopic, thus permitting it to be stored in bulk and packaged and transported in bags or other similar containers.

Now having described our invention, what we claim is:

1. A process of producing an edible substantially nonhygroscopic molasses food product, which comprises comminuting citrus fruit residue containing its natural moisture, heating said comminuted residue in the presence of an added and non-toxic calcium compound, removing excess moisture from said treated residue, mixing said partially dehydrated residue with liquid molasses, and subjecting said mixture to drying to reduce the same to the form of a dried powdered material.

2. The process of producing an edible substantially nonhygroscopic molasses food product, which comprises comminuting citrus fruit residue containing its natural moisture, steaming said comminuted residue in the presence of added nontoxic calcium compounds, removing excess moisture from said treated residue, mixing said partially dehydrated residue with liquid molasses, and subsequently dehydrating the mixture.

3. The process of producing an edible substantially nonhygroscopic molasses food product, which comprises comminuting citrus fruit residue containing its natural moisture, steaming said comminuted residue in the presence of added non-toxic calcium compounds including dicalcium phosphate, removing excess moisture from said treated residue by filtration, mixing said partially dehydrated residue with liquid molasses, and subsequently dehydrating the mixture.

4. The process of producing an edible substantially nonhygroscopic molasses food product, which comprises comminuting citrus fruit residue containing its natural moisture, steaming said comminuted residue in the presence of added calcium hydroxide, removing excess moisture from said treated residue by filtration, mixing said partially dehydrated residue with liquid molasses, and subsequently dehydrating the mixture.

5. The process of producing an edible substantially nonhygroscopic molasses food product, which comprises comminuting citrus fruit residue containing its natural moisture, steaming said comminuted residue in the presence of added calcium carbonate and dicalcium phosphate, removing excess moisture from said treated residue by filtration, mixing said partially dehydrated residue with liquid molasses, and subsequently dehydrating the mixture.

6. The steps in a process of producing an edible substantially nonhygroscopic molasses food product, which comprises treating with molasses comminuted undried citrus fruit residue which has been steamed in the presence of added dietary minerals, and subsequently dehydrating the resulting mixture.

7. In a process of producing an edible substantially nonhygroscopic molasses food product, the steps which comprise treating with molasses comminuted undried citrus fruit residue which has been steamed in the presence of calcium carbonate and dicalcium phosphate, and subsequently dehydrating the resulting mixture.

8. A substantial nonhygroscopic, dried, molasses food product for animal feeding, having as a base a cooked formulated mixture of comminuted citrus fruit residue and dietary mineral matter, and containing added molasses, a substantial portion of said molasses being absorbed into the cellular structure of said base, said cellular structure being absorbent as a result of its treatment with mineral matter, thereby providing a dried product sufficiently free from stickiness to permit storing, packaging, and shipping.

9. The product of claim 8 in which the molasses content is 50%–70% by weight on a dry basis.

10. The product of claim 8 in which the dietary mineral matter comprises a non-toxic calcium compound.

11. The product of claim 8 in which the dietary mineral matter comprises a non-toxic calcium compound, and in which the molasses content is 50%–70% by weight on a dry basis.

EMORY L. COCKE.
BENJAMIN H. TICKNOR, II.